(12) United States Patent
Morita

(10) Patent No.: US 9,838,582 B2
(45) Date of Patent: Dec. 5, 2017

(54) IMAGE PICKUP APPARATUS AND CONTROL METHOD FOR DISPLAYING A SCREEN RELATED TO A SETTING OF A LIGHT EMISSION

(71) Applicant: CANON KABUSHIKI KAISHA, Tokyo (JP)

(72) Inventor: Takuro Morita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/745,280

(22) Filed: Jun. 19, 2015

(65) Prior Publication Data

US 2015/0373242 A1  Dec. 24, 2015

(30) Foreign Application Priority Data

Jun. 23, 2014 (JP) ................. 2014-128587

(51) Int. Cl.
*H04N 5/222* (2006.01)
*H04N 5/225* (2006.01)
*G03B 15/05* (2006.01)
*H04N 5/232* (2006.01)
*H04N 5/235* (2006.01)

(52) U.S. Cl.
CPC ........... *H04N 5/2256* (2013.01); *G03B 15/05* (2013.01); *H04N 5/2354* (2013.01); *H04N 5/23216* (2013.01); *H04N 5/23293* (2013.01); *G03B 2215/0507* (2013.01)

(58) Field of Classification Search
CPC .............................. H04N 5/2256; G03B 15/05

USPC ........................................................ 348/370
See application file for complete search history.

(56) References Cited

U.S. PATENT DOCUMENTS

| 6,154,210 A * | 11/2000 | Anderson ............. G03B 17/02 345/173 |
| 6,738,075 B1 * | 5/2004 | Torres .................. G11B 27/034 348/333.05 |
| 2006/0140616 A1 * | 6/2006 | Kuruma ................. G03B 15/05 396/165 |
| 2007/0204237 A1 * | 8/2007 | Guo ...................... G06F 3/0202 715/822 |

(Continued)

FOREIGN PATENT DOCUMENTS

JP  2005-250399 A  9/2005

*Primary Examiner* — Usman Khan
(74) *Attorney, Agent, or Firm* — Canon U.S.A., Inc. IP Division

(57) ABSTRACT

An image pickup apparatus includes a light emission unit configured to be able to move to light emission and non-light emission positions, an operation unit operable by a user, and a display control unit configured to display a setting screen related to the light emission unit, in which the first light emission unit is configured to move from the non-light emission position to the light emission position upon operation of the operation unit when the first light emission unit is located at the non-light emission position and configured not to move from the light emission position to the non-light emission position upon operation of the operation unit when the first light emission unit is located at the light emission position, and the display control unit is configured to display the first setting screen upon operation unit when the first light emission unit is located at the light emission position.

13 Claims, 3 Drawing Sheets

(56) References Cited

U.S. PATENT DOCUMENTS

| | | | | |
|---|---|---|---|---|
| 2008/0106630 A1* | 5/2008 | Matsuda | ............... | G03B 15/05 348/333.01 |
| 2009/0028537 A1* | 1/2009 | Tamura | ............... | G03B 17/00 396/55 |
| 2011/0185313 A1* | 7/2011 | Harpaz | ............... | G06F 3/0482 715/826 |
| 2012/0106940 A1* | 5/2012 | Kaneda | ............... | G03B 15/05 396/177 |
| 2012/0294601 A1* | 11/2012 | Akiyama | ............... | G03B 15/05 396/177 |

* cited by examiner

FIG. 3A

| FLASH SETTING SCREEN |
|---|
| THIS MENU IS NOT DISPLAYED WHEN THE FOLLOWING FUNCTION IS SET<br><br>[HDR IMAGE PICKUP MODE] |

FIG. 3B

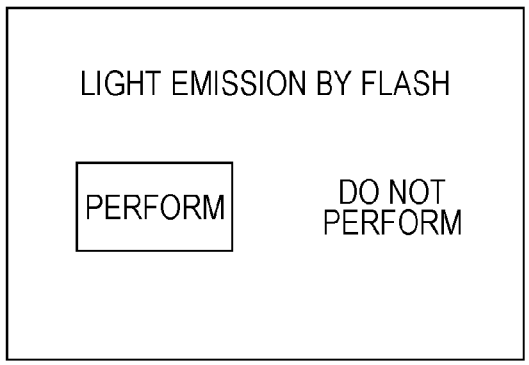

FIG. 3C

| FLASH SETTING ITEM | SETTING STATE |
|---|---|
| LIGHT EMISSION MODE | MANUAL LIGHT EMISSION |
| WIRELESS SETTING | OFF |
| LIGHT EMISSION AMOUNT | 1/1 |
| SYNCHRONISM SETTING | FIRST CURTAIN |

FIG. 3D

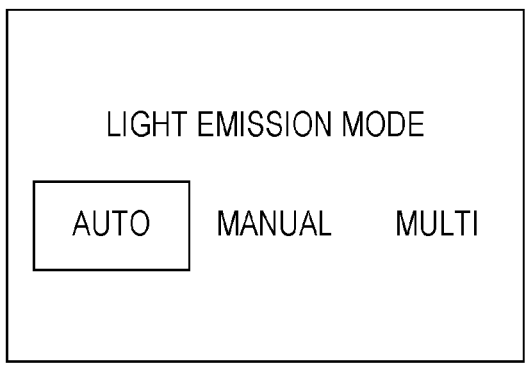

FIG. 3E

| FLASH SETTING ITEM | SETTING STATE |
|---|---|
| LIGHT EMISSION MODE | MANUAL LIGHT EMISSION |
| WIRELESS SETTING | OFF |
| LIGHT EMISSION AMOUNT | 1/1 |
| SYNCHRONISM SETTING | FIRST CURTAIN |
| ILLUMINATING ANGLE | AUTO | though IMAGE PICKUP APPARATUS AND
CONTROL METHOD FOR DISPLAYING A
SCREEN RELATED TO A SETTING OF A
LIGHT EMISSION

BACKGROUND

Field of the Disclosure

The present disclosure relates to an image pickup apparatus that can display a screen related to a setting of a light emission unit on a display unit.

Description of the Related Art

Up to now, a display of a setting screen for performing a detailed setting of a light emission unit on a display unit has been proposed. A user can subsequently perform the setting of the light emission unit on the basis of this setting screen.

Japanese Patent Laid-Open No. 2005-250399 discloses an image pickup apparatus that displays a flash selection menu for performing a setting related to the flash on the display unit in a case where a flash mode setting is selected from a menu displayed on the display unit.

SUMMARY

An aspect of the claimed invention relates to an image pickup apparatus including: a first light emission unit configured to be able to move to a light emission position and a non-light emission position; an operation unit operable by a user; and a display control unit configured to display a first setting screen related to a setting of the first light emission unit on a display unit, in which the first light emission unit is configured to move from the non-light emission position to the light emission position in accordance with an operation of the operation unit in a state in which the first light emission unit is located at the non-light emission position, the first light emission unit is configured not to move from the light emission position to the non-light emission position in accordance with the operation of the operation unit in a state in which the first light emission unit is located at the light emission position, and the display control unit is configured to display the first setting screen on the display unit in accordance with the operation of the operation unit in a state in which the first light emission unit is located at the light emission position.

According to the claimed invention, it is possible to display a screen related to a setting of a light emission unit without an involvement of a complicated operation by a user.

Further features of the present invention will become apparent from the following description of exemplary embodiments with reference to the attached drawings.

BRIEF DESCRIPTION OF THE DRAWINGS

FIGS. 3A to 3E are explanatory diagrams for describing screens that can be displayed on a display unit of the digital camera functioning as the image pickup apparatus according to the exemplary embodiment for carrying out the present invention for illustrative purposes.

DESCRIPTION OF THE EMBODIMENTS

Exemplary Embodiment

Figure 1:
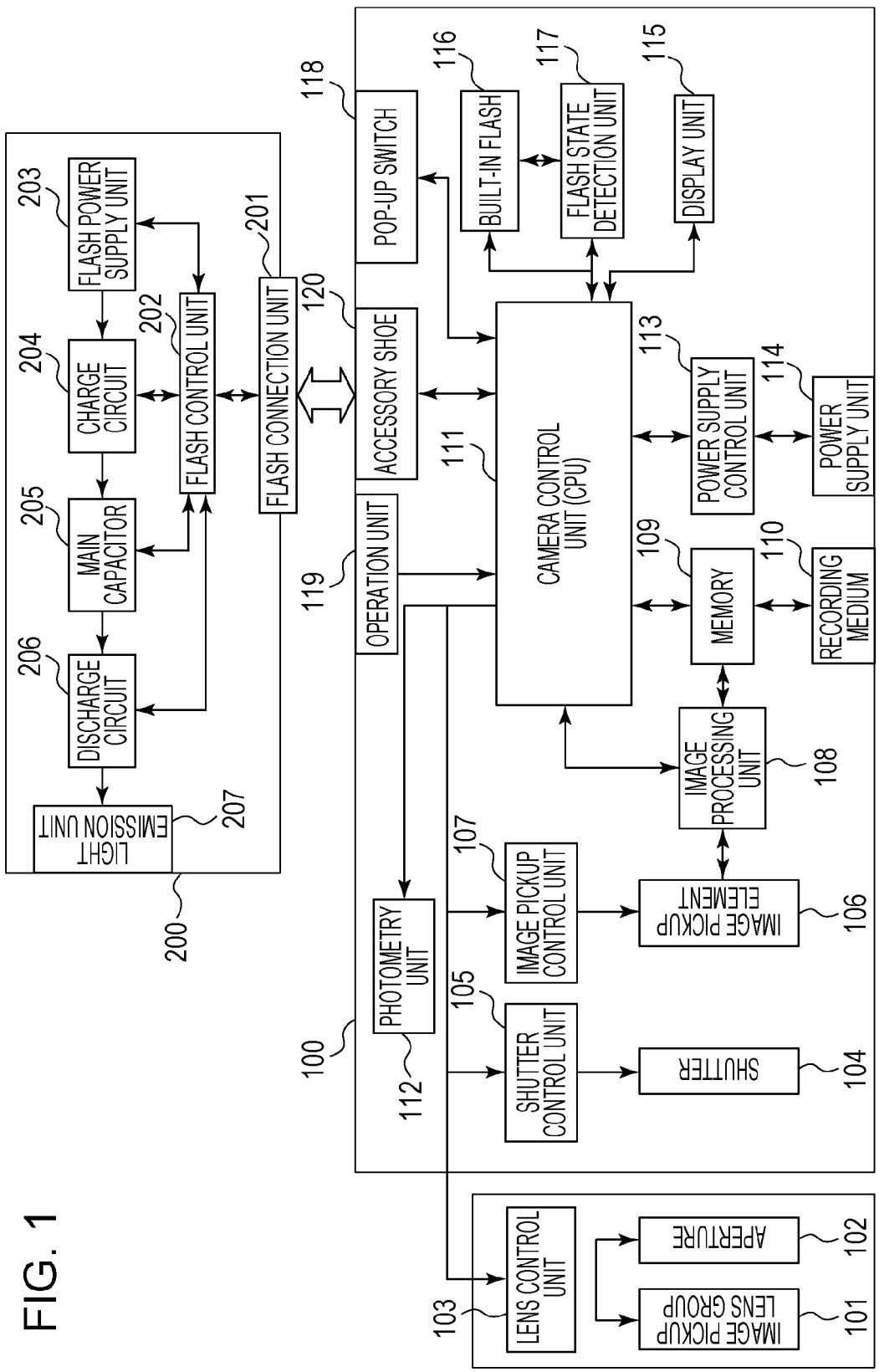
FIG. 1 is a block diagram for describing a configuration of a digital camera functioning as an image pickup apparatus according to an exemplary embodiment for carrying out the present invention.

A digital camera (hereinafter, will be simply referred to as camera) 100 functioning as an image pickup apparatus according to an exemplary embodiment for carrying out the present invention will be described with reference to FIG. 1, FIG. 2, and FIGS. 3A to 3E. Hereinafter, a basic configuration of the camera 100 will be described with reference to FIG. 1. FIG. 1 is a block diagram for describing a configuration of the camera 100 functioning as the image pickup apparatus according to the exemplary embodiment for carrying out the present invention. It is noted that an external flash 200 that will be described below is a light emitting apparatus that can be detachably attached to the camera 100.

An image pickup lens group 101 is a lens group constituted by a plurality of lenses including an optical axis shift lens, a zoom lens, and a focus lens. An aperture 102 is a light amount adjustment member configured to adjust the amount of transmitted light in the image pickup lens group 101.

A lens control unit 103 is a control unit configured to control driving of the image pickup lens group 101 and the aperture 102 and is controlled by a camera control unit (hereinafter, referred to as CPU) 111 which will be described below. It is noted that the camera 100 according to the present exemplary embodiment is a so-called lens interchangeable type digital camera from which a lens unit constituted by the image pickup lens group 101, the aperture 102, and the lens control unit 103 can be detached but is not limited to this. For example, a configuration in which the above-described lens unit is integrally provided with the camera 100 may also be adopted.

A shutter 104 and an image pickup element 106 are provided in a subsequent stage of the aperture 102. The shutter 104 is a shielding member configured to switch a state of the image pickup element 106 between an exposure state and a non-exposure state.

A shutter control unit 105 is a control unit configured to control driving of the shutter 104 in accordance with an instruction of the CPU 111 which will be described below.

According to the present exemplary embodiment, it is possible to control an exposure time (accumulation time) of an image (image data) obtained by picking up an image of a subject by controlling the driving of the shutter 104. According to the present exemplary embodiment, a configuration in which operation of the shutter 104 functioning as a so-called mechanical shutter is controlled is adopted, but a configuration for adopting a so-called electronic shutter system may also be employed.

The image pickup element 106 is a charge accumulation type image pickup element constituted by a solid-state image pickup element such as a CCD or a CMOS, and pixels for the image pickup are two-dimensionally arranged. When an optical image of the subject is formed on the image pickup element 106, accumulation of electric charges corresponding to this optical image is performed.

An image pickup control unit 107 is a control unit configured to control an operation of the image pickup element 106, and an analog electric signal (analog image data) in accordance with the optical image of the subject formed on the image pickup element 106 is output from the image pickup element 106 to an image processing unit 108. It is noted that an analog front end (AFE) which is not illustrated in the drawing is provided in the image processing unit 108. The analog image data output from the image pickup element 106 is subjected to an adjustment of an analog gain amount and sampling by the AFE and is then converted into digital image data by an analog-to-digital (A/D) conversion unit.

The image processing unit 108 is a processing unit configured to perform resize processing, color conversion processing, calculation processing for a ranging control, and the like on the image data output from the image pickup element 106. In addition, the image processing unit 108 performs automatic white balance (AWB) processing of a through the lens (TTL) system, autofocus (AF) processing, and auto exposure (AE) processing. Furthermore, the image processing unit 108 also performs an adjustment of a digital gain amount with respect to the converted digital image data and a calculation (dimmer calculation) for a light emission amount when the external flash 200 is caused to emit light. According to the present exemplary embodiment, the image pickup element 106 and the image processing unit 108 are collectively referred to as image pickup unit.

A memory 109 is a memory that can electrically perform deletion and storage and includes, for example, an EEPROM or the like which is represented by a flash memory or the like. The memory 109 stores various data used in the present exemplary embodiment. For example, the memory 109 stores programs to be executed in the camera 100, constants for the operations, various exposure amounts (exposure conditions), calculation expressions, information related to a type of the external flash 200, and the like. It is noted that the programs executed in the camera 100 refer to programs for instructing operations similar to a flow illustrated in FIG. 2 which will be described below.

The memory 109 also includes a recording area for the image data which is constituted by a recording element such as a DRAM and can record a predetermined number of still images, a predetermined time of moving images, and audio data. That is, the memory 109 can record the obtained digital image data. Furthermore, the memory 109 is also used as an image display memory (video memory), a work area for the CPU 111, and a recording buffer for a recording medium 110 which will be described below. The digital image data recorded in the memory 109 is converted into analog image data for the display by a digital-to-analog (D/A) conversion unit that is not illustrated in the drawing and transmitted to a display unit 115 constituted by an LCD or the like.

The recording medium 110 is a recording medium that can record the digital image data recorded in the memory 109. The recording medium 110 according to the present exemplary embodiment can communicate with the CPU 111 in a state in which the recording medium 110 is inserted into an inner part of a main body of the camera 100 to be electrically connected to the camera 100. It is noted that the recording medium 110 is not limited to the memory card or the like that can be inserted into and removed from the camera 100 and may be an optical disc such as a DVD-RW disc or a magnetic disc such as a hard disc drive. A configuration in which the recording medium 110 is previously built in the camera 100 may also be adopted instead of the detachable recording medium 110.

The CPU 111 is a control unit configured to control the operations of the respective units constituting the camera 100 in an overall manner. For example, the CPU 111 is a display control unit configured to perform a control for causing the display unit 115 that will be described below to display a setting screen related to a built-in flash 116 that will be described below or the light emission of the external flash 200.

The CPU 111 is also a detection unit (second detection unit) configured to detect that the external flash 200 is connected to the camera 100. The CPU 111 is also a control unit (movement control unit) configured to control a movement of the built-in flash 116 that will be described below. Furthermore, the CPU 111 is also a control unit configured to perform a control related to the light emission by the built-in flash 116 in accordance with a detection result of a flash state detection unit 117. Specifically, the CPU 111 can perform a control related to a light emission timing of the built-in flash 116 and a light emission amount of the built-in flash 116.

In addition to the above, the CPU 111 can control the lens control unit 103, the shutter control unit 105, the image pickup control unit 107, the image processing unit 108, the memory 109, a photometry unit 112 that will be described below, a power supply control unit 113, the flash state detection unit 117, and the like. It is noted that the CPU 111 can also execute the program stored in the memory 109 and control the operation in the internal part of the camera 100 in accordance with the processing of this program.

The photometry unit 112 is a photometry unit such as photometry sensors divided into a plurality of areas. The image processing unit 108 described above performs a photometry calculation on the basis of the signal output from the photometry unit 112 and obtains photometric values of the respective areas. It is noted that a configuration in which a photometric value of the subject is calculated on the basis of the image data output from the image pickup element 106 without the provision of the photometry unit 112 may also be adopted.

A power supply unit 114 is a primary battery such as an alkaline battery or lithium (Li) battery, a secondary battery such as a nickel cadmium (NiCd) battery, nickel metal hydride (NiMH) battery, or Li battery, an AC adapter, or the like and supplies electric power to the power supply control unit 113. The power supply control unit 113 is constituted by a DC-DC converter, a switch circuit configured to switch an energization block, and the like. The power supply control unit 113 then detects the presence or absence of the attachment of the battery, a type of the battery, a remaining battery level, or the like in the power supply unit 114 to control the DC-DC converter on the basis of the detection result and the instruction of the CPU 111 and supplies necessary voltages to the respective units of the camera 100 for necessary periods.

The display unit 115 is a display unit configured to display received analog image data for display in accordance with the instruction from the CPU 111. The camera 100 according to the present exemplary embodiment can perform so-called live view display by consecutively displaying the analog image data for display (live view) periodically continuously obtained on the display unit 115.

The display unit 115 is also a display unit that can display a setting screen for performing a setting related to light emission by the external flash 200 and the built-in flash 116. According to the present exemplary embodiment, it is possible to separately display a setting screen (first screen) for performing a setting related to the external flash 200 which will be described below and a setting screen (second screen) for performing a setting related to the built-in flash 116 on the display unit 115. A detail of this will be described below.

Furthermore, the display unit 115 can also display an error screen related to the built-in flash 116 and the external flash 200 which will be described below and a screen for setting as to whether or not the light emission by the flash can be performed. A detail of this will also be described below.

The built-in flash 116 is a light emission unit (first light emission unit) configured to perform light emission for illuminating the subject with light. The built-in flash 116 can move to a non-light emission position housed in the camera 100 and a light emission position that projects from an external form of the camera 100. The built-in flash 116 can perform light emission in a state in which the built-in flash 116 is located at the light emission position. It is noted that the above-described light emission position refers to a position where the light emission by the built-in flash 116 is allowed by the CPU 111, and the above-described non-light emission position refers to a position other than the light emission position where the built-in flash 116 can move.

The flash state detection unit 117 is a detection unit (first detection unit) configured to detect a state of the state of the built-in flash 116. According to the present exemplary embodiment, a pop-up switch 118 that will be described below detects a position of the built-in flash 116 in accordance with an operation by the user and transmits a result of this detection to the CPU 111.

The pop-up switch 118 is an operation unit that can move the built-in flash 116 (position of the built-in flash 116) in accordance with the operation by the user. The pop-up switch 118 according to the present exemplary embodiment is a switch with which a predetermined signal can be transmitted to the CPU 111 when the user presses the switch. The CPU 111 changes (moves) the position of the built-in flash 116 by a moving member that is not illustrated in the drawing in accordance with reception of this predetermined signal. That is, the operation input by the user can be performed with the pop-up switch 118. The pop-up switch 118 can also indirectly move the built-in flash 116 in accordance with the user operation.

It is noted that the movement operation of the built-in flash 116 in accordance with the press of the pop-up switch 118 by the user is not limited to this. For example, a configuration in which the pop-up switch 118 is a mechanically constructed operation unit, and a mechanical lock of the built-in flash 116 is cancelled in accordance with a situation where the pop-up switch 118 is operated by the user may also be adopted. In this case, when the lock of the built-in flash 116 is cancelled, the built-in flash 116 moves (pops up) from the non-light emission position to the light emission position. That is, the pop-up switch 118 in this case can directly move the built-in flash 116 in accordance with the user operation.

According to the present exemplary embodiment, the case in which the pop-up switch 118 is the switch has been described, but the pop-up switch 118 may adopt a configuration where a component other than the switch such as a lever is used.

In addition, according to the present exemplary embodiment, it is also possible to display the error screen related to the built-in flash 116 and the external flash 200 which will be described below and the screen for performing the setting as to whether or not the light emission by the flash can be performed on the display unit 115 in accordance with the operation of the pop-up switch 118. A detail of this will be described below.

An operation unit 119 is an input device group constituted by operation members such as a switch, a button, a dial, or a touch panel for the user to perform various instructions and settings with respect to the camera 100. For example, the operation unit 119 includes a power supply switch, a release button, a menu button, a direction button, an execution button, and the like. It is noted that a configuration may be adopted in which the display unit 115 is a touch panel of an electrostatic capacitance system, and a user interface displayed on the display unit 115 is operated and selected, so that it is possible to realize an input of information similar to the input of the information when the operation unit 119 is operated.

The operation unit 119 is also provided with a mode setting switch for setting an image pickup mode. While this mode setting switch is operated by the user, an image pickup mode for picking up an image of the subject can be set. It is noted that image pickup modes that can be set according to the present exemplary embodiment include an auto mode, a scene mode, a high dynamic range (HDR) mode, a manual mode in which various settings at the time of the image pickup are performed by a manual operation by the user, and the like. The already set exposure condition and various settings related to the flash which are set in the camera 100 are applied to the configuration in the auto mode, the scene mode, and the HDR mode.

An accessory shoe 120 is an attachment part for connecting an external device such as the external flash 200 that will be described below to the camera 100. It is noted that an external device other than the external flash 200 such as an electronic viewfinder or a GPS unit can be attached to the accessory shoe 120.

Terminal groups each constituted by a plurality of terminals are respectively provided to an internal part of the accessory shoe 120 and a flash connection unit 201 of the external flash 200 that will be described below. According to the present exemplary embodiment, while these terminal groups are electrically connected to each other, the camera 100 and the external flash 200 can communicate with each other.

According to the present exemplary embodiment, the configuration in which the CPU 111 detects the connection of the external flash 200 to the camera 100 by detecting the communication between the camera 100 and the external flash 200 is adopted. Specifically, the CPU 111 transmits a predetermined signal to a flash control unit 202 and detects (determines) whether or not the external flash 200 is connected to the camera 100 in accordance with the presence or absence of a reply to the predetermined signal from the flash control unit 202.

It is noted that the connection between the camera 100 and the external flash 200 is not limited to this. For example, a configuration may also be adopted in which a pin for the connection detection which is in a pressed state when the external flash 200 is attached is provided to the accessory shoe 120, and the attachment of the external flash 200 to the camera 100 is detected by detecting a pressed state of this pin. In addition, a configuration may also be adopted in which the attachment of the external flash 200 to the camera 100 is detected by detecting a conductive state between the camera 100 and the external flash 200. In addition to the above, any configuration may be adopted as the unit that detects the attachment of the external flash 200 to the camera 100.

Hereinafter, a basic configuration of the external flash 200 including a built-in light emission unit (first light emission unit) 207 will be described with reference to FIG. 1. The external flash 200 is a light emission apparatus configured to illuminate the subject with light by using a xenon tube, a light emitting diode (LED), or the like as the light emission unit 207. In the following explanation, the CPU 111 and the flash control unit 202 appropriately perform the communication with each other when necessary.

In a state in which the accessory shoe 120 of the camera 100 is connected to the flash connection unit 201 of the external flash 200, and power supply of the camera 100 and the external flash 200 is turned on, the external flash 200 and the camera 100 are electrically connected to each other. In this state, the respective terminal groups of the camera 100 and the external flash 200 are connected to each other, and the CPU 111 and the flash control unit 202 can perform the communication with each other.

The flash control unit 202 is a control unit configured to control the operation of the external flash 200 in an overall manner. The flash control unit 202 can transmit and receive signals with the CPU 111 in a state in which the camera 100 and the external flash 200 are connected to each other. When the communication with the CPU 111 is detected, the flash control unit 202 transmits information related to the external flash 200 to the CPU 111. It is noted that, in a case where the CPU 111 detects a failure of the communication with the flash control unit 202 of the external flash 200, the CPU 111 determines that the external flash 200 is in a state of not being connected to the camera 100.

A charge circuit 204 is a circuit configured to increase an output voltage that has been output from a flash power supply unit 203 to a predetermined voltage. A main capacitor 205 is a charge unit configured to perform charging of electric charges corresponding to the predetermined voltage output from the charge circuit 204. A discharge circuit 206 is a circuit configured to supply the light emission unit 207 with the electric charges that have been charged in the main capacitor 205.

When the power supply of the camera 100 is in an on state, the charge circuit 204 increases the output voltage that has been output from the flash power supply unit 203 to the predetermined voltage by the instruction from the flash control unit 202, and the main capacitor 205 is charged with the electric charges corresponding to the predetermined voltage.

When the flash control unit 202 measures that the voltage of the main capacitor 205 is charged up to the predetermined voltage, the electric charges corresponding to the predetermined voltage are supplied from the main capacitor 205 via the discharge circuit 206 to the light emission unit 207.

The light emission unit 207 can illuminate the subject with light by executing flashlight emission at a light emission amount corresponding to the supplied the electric charges. It is noted that the above-described predetermined voltage is a voltage necessary to obtain the light emission amount for appropriately illuminating the subject with light and is calculated on the basis of a result of the dimmer calculation processing in the image processing unit 108.

In a case where the external flash 200 is caused to emit light in synchronism with the image pickup of the subject, the flash control unit 202 determines whether or not the main capacitor 205 is charged with the electric charges corresponding to the predetermined voltage. Specifically, it is determined whether or not the main capacitor 205 is charged with the electric charges corresponding to the predetermined voltage by determining whether or not the charged voltage of the main capacitor 205 is charged up to the predetermined voltage. The camera 100 according to the present exemplary embodiment can perform the light emission of the external flash 200 in a state in which it is determined that the voltage of the main capacitor 205 is charged up to the predetermined voltage.

An outer package part of the external flash 200 is provided with an operation unit (not illustrated) for the external flash with which settings related to the external flash 200 can be performed. While the user operate this operation unit for the external flash, it is possible to perform various settings related to the external flash 200. The set information is transmitted from the external flash 200 to the camera 100 in accordance with the request from the CPU 111, and a content of the display on a setting screen for the external flash 200 is set on the display unit 115 on the basis of this information. A detail of this will be described below.

Hereinafter, the operation of the camera 100 will be described in a case where the built-in flash 116 or the external flash 200 is caused to emit light to pick up the image of the subject. It is noted that, in the following explanation, the obtained image (data) and the information such as the exposure amount and the evaluation value are recorded in the memory 109 after the obtainment thereof, and readout is appropriately executed by the CPU 111. In addition, in the following explanation, a case is supposed where the setting related to the light emission by the built-in flash 116 or the external flash 200 is completed in advance by the flash setting processing which will be described below.

When the user operates a release button of the operation unit 119 in a state in which the power supply of the camera 100 is on, the CPU 111 determines whether or not the release button of the operation unit 119 is put into an SW1 state (for example, a half-stroke state).

When this determination indicates that the release button is in the SW1 state, the image processing unit 108 executes focus processing (AF processing) on the basis of the previously obtained image data (for example, the live view or the like). The AF processing according to the present exemplary embodiment includes calculating an AF evaluation value from contrast information of luminance components of the image and setting respective lens positions of the image pickup lens group 101 by the lens control unit 103 on the basis of this AF evaluation value.

It is noted that the configuration in which the AF processing is performed by using the digital image data obtained by the image pickup element 106 is adopted according to the present exemplary embodiment but is not limited to this. For example, a configuration may also be adopted in which an AF sensor is provided to the camera 100, and the AF processing is performed by using this AF sensor. In addition, the method of calculating the AF evaluation value is not limited to this method, and other calculation methods may be used.

When it is determined that the release button is in the SW1 state, the image processing unit 108 performs the photometry calculation on the basis of the previously obtained image data by the photometry unit 112. The method for the photometry calculation includes dividing one screen of the image into a plurality of blocks and calculating an average photometric value for each of these blocks. Subsequently, a representative photometric value is calculated by integrating the average photometric values of all the blocks.

The present embodiment relates to the configuration in which the subsequent processing is executed while this representative photometric value is set as the luminance information of the subject, but the configuration is not limited to this. For example, a method of calculating the luminance information of the subject by using a photometry method such as spot photometry may of course be employed. That is, any related-art method may be used as the method for calculating the luminance information of the subject which is used in the subsequent processing.

Next, the image processing unit 108 reads out the previously calculated luminance information of the subject from the memory 109 and sets such an exposure amount that the subject has an appropriate luminance in the camera 100 (AE processing) on the basis of this luminance information. It is noted that the exposure amount according to the present exemplary embodiment refers to a value for setting a luminance of the obtained image and is set by changing exposure conditions such as an aperture value, an exposure time, and a gain amount.

Next, the image processing unit 108 reads out the previously calculated luminance information of the subject and the exposure conditions from the memory 109 and executes the dimmer calculation for calculating the light emission amount of the built-in flash 116 or the external flash 200. The above-described various processings may be performed in any order, and a configuration in which these processings are respectively performed in parallel may also be adopted.

Next, the CPU 111 determines whether or not the release button of the operation unit 119 is put into an SW2 state (for example, a full-stroke state by the user operation). When it is determined that the release button is in the SW2 state, the CPU 111 transmits a signal indicating that the light emission is to be started to the built-in flash 116 or the external flash 200. Subsequently, the CPU 111 causes the above-described image pickup unit to pick up the image of the subject in synchronism with the light emission by the built-in flash 116 or the external flash 200.

The analog image data obtained by this image pickup is recorded in the memory 109 and the recording medium 110 in a state in which the above-described various processings and conversions are applied to the analog image data, and displayed on the display unit 115 at the same time. The operation when the built-in flash 116 or the external flash 200 is caused to emit light to pick up the image of the subject has been described above.

Here, in recent years, the number of items that can be set in the camera (hereinafter, referred to as setting items) tends to be increased along with an advancement of camera functions. When these setting items are arranged in one setting screen, the setting screen becomes complicated. Then, this complicated setting screen becomes a cause of an erroneous operation of the camera by the user or an adverse effect on an intuitive operation of the camera by the user.

As a method of solving this problem, setting screens in which associated setting items are respectively organized are displayed on the display unit in general. While the user operates the operation unit or the like provided to the camera, a setting screen including an arbitrary setting item desired to be operated by the user itself is displayed on the display unit. The user then selects the arbitrary setting item from the setting screen, so that it is possible to perform the arbitrary setting related to the camera.

A method of varying an order of displaying the respective setting screens in accordance with a setting frequency (use frequency) of the setting item allocated in the setting screen has been proposed. Specifically, when the user performs the operation for displaying the setting screen on the display unit, the setting screen in which the setting items having a high setting frequency are organized is displayed first. The setting items having the high setting frequency include, for example, settings on the exposure condition, the number of times to perform the image pickup, the image pickup mode, the photometry area, and the like.

The setting screen in which the setting items having a low setting frequency are organized is displayed on the display unit after the user performs the operation for shifting the setting screen. For example, the setting items having a relatively low setting frequency as compared with the setting items such as the above-described exposure condition and the number of times to perform the image pickup include the setting items related to the light emission unit such as the flash and the like.

In addition, to avoid the complication of the display also in the respective setting screens, a plurality of setting screens are classified into a plurality of hierarchical levels and displayed on the display unit in accordance with a category of the setting item in general. For example, the setting item for selecting the built-in flash and the external flash is displayed in the setting screen at a certain hierarchical level, and the setting item for setting a detail of the built-in flash and the external flash is displayed in the setting screen at a hierarchical level deeper than this hierarchical level. As explained above, the method of sorting out the display order and the hierarchical levels of the respective setting screens related to the settings of the respective units of the camera to avoid the complication of the setting screen has been proposed.

However, as described above, to display the setting screen related to the light emission unit on the display unit, the user needs to go through the plurality of setting screens. Furthermore, to set the setting item intended by the user in the setting screen related to the light emission unit, the user may need to go through the plurality of hierarchical levels in some cases. In this manner, to display the setting screen intended by the user among the setting screens related to the light emission unit on the display unit, the user needs to perform the complicated operation.

Figure 2:
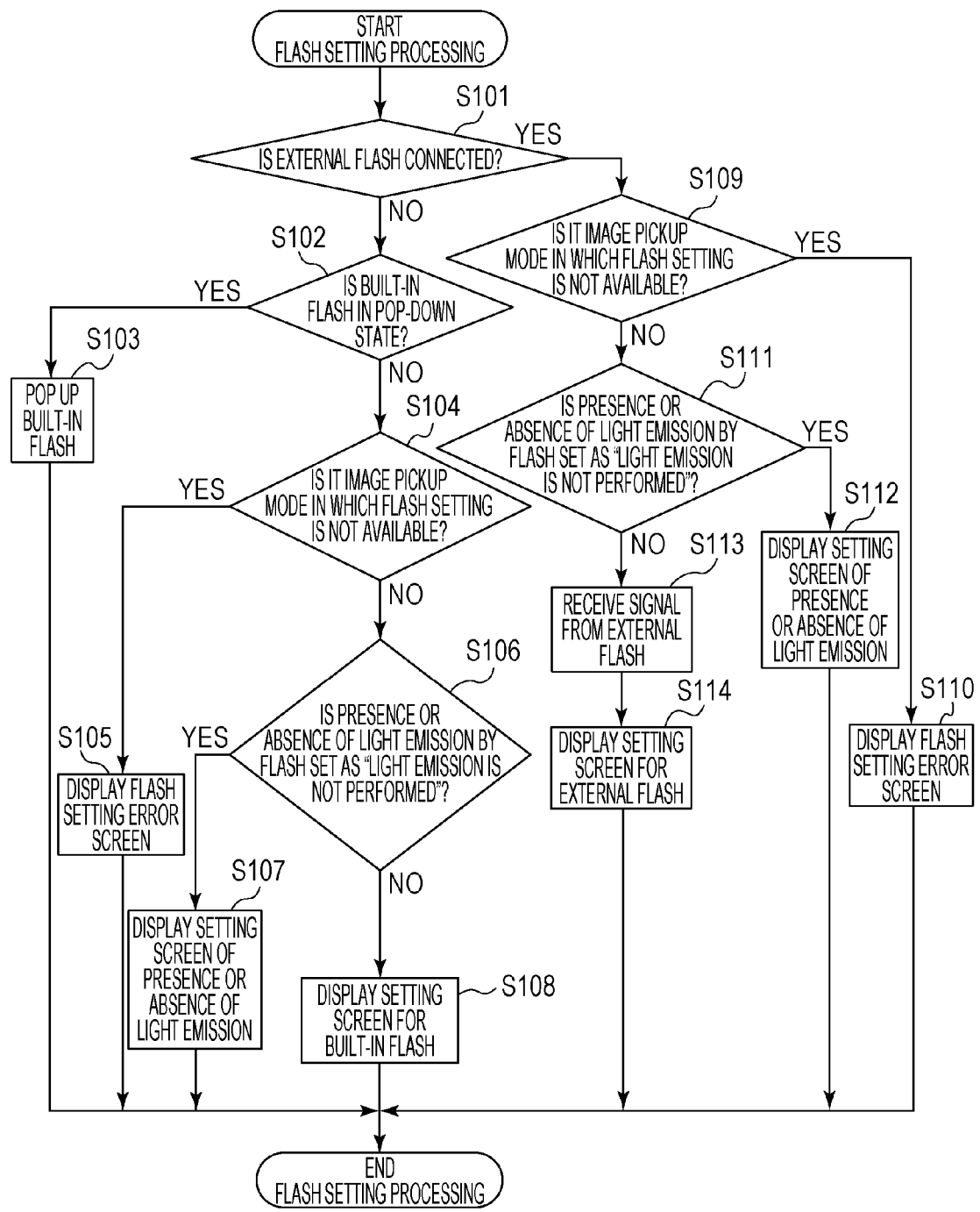
FIG. 2 is a flow chart for describing flash setting processing by the digital camera functioning as the image pickup apparatus according to the exemplary embodiment for carrying out the present invention.

In view of the above, in the camera 100 according to the present exemplary embodiment, the pop-up switch 118 for causing the built-in flash 116 to pop up is provided with a function of displaying the setting screen related to the built-in flash 116 or the external flash 200. Hereinafter, a detail of this will be described with reference to FIG. 2. FIG. 2 is a flow chart for describing the flash setting processing of the camera 100 according to the exemplary embodiment for carrying out the present invention.

When the flash setting processing is started in accordance with the operation of the pop-up switch 118 by the user, the CPU (second detection unit) 111 detects the connection of the external flash 200 to the camera 100 in step S101.

Hereinafter, descriptions will be given of processing in a case where a state is determined in which the external flash 200 is not connected to the camera 100 (step S101: NO). In step S102, the CPU 111 detects the state of the built-in flash 116 when the pop-up switch 118 is turned on by the flash state detection unit 117. Specifically, it is detected as to whether the position of the built-in flash 116 is the non-light emission position (pop-down state) or the light emission position (pop-up state) when the pop-up switch 118 is turned on.

In a case where the CPU 111 determines that the built-in flash 116 is in the pop-down state (step S102: YES), the CPU (movement control unit) 111 moves the position of the built-in flash 116 from the non-light emission position to the light emission position in step S103. That is, the built-in flash 116 is caused to pop up. When the pop-up of the built-in flash 116 is completed, the current flash setting processing is terminated.

On the other hand, in a case where the CPU 111 determines that the built-in flash 116 is in the pop-up state (step S102: NO), the flow proceeds to step S104. In step S104, the CPU (mode determination unit) 111 determines whether or not the image pickup mode set in the camera 100 is a mode in which the setting related to the built-in flash 116 and the external flash 200 is not allowed.

The mode in which the setting related to the built-in flash 116 and the external flash 200 is not allowed refers to an image pickup mode in which the setting related to the light emission by the built-in flash 116 and the external flash 200 has been previously specified. For example, in a case where the image pickup mode is the auto mode, the scene mode, or the HDR mode, the built-in flash 116 and the external flash 200 are caused to emit light on the basis of the setting previously specified for each mode. In this case, the setting related to the light emission by the built-in flash 116 and the external flash 200 by the manual operation of the user is not allowed.

In view of the above, according to the present exemplary embodiment, when it is determined that the image pickup mode set in the camera 100 is set as a mode in which the setting of the flash is not allowed (step S104: YES), an error display is performed on the display unit 115. Specifically, as illustrated in FIG. 3A, in step S105, the CPU (display control unit) 111 displays a screen indicating that the setting of the built-in flash 116 or the external flash 200 is not allowed (hereinafter, referred to as error display screen) on the display unit 115.

FIGS. 3A to 3E are explanatory diagrams for describing screens that can be displayed on the display unit 115 of the camera 100 functioning as the image pickup apparatus according to the exemplary embodiment for carrying out the present invention for illustrative purposes. FIG. 3A is the explanatory diagram for describing the screen displayed in a case where the HDR mode is set for illustrative purpose. As illustrated in FIG. 3A, in a case where the image pickup mode in which the setting related to the light emission by the light emission unit is not allowed such as the HDR mode is set, an image indicating that the setting related to the light emission by this light emission unit is not allowed is displayed on the display unit 115. With the above-described configuration, in a case where the image pickup mode set in the camera 100 is the mode in which the setting of the flash is not allowed, the user can check whether or not the setting of the built-in flash 116 and the external flash 200 is allowed.

With reference to FIG. 2 again, when it is determined that the set image pickup mode is set as a mode in which the setting of the flash can be performed (step S104: NO), the flow proceeds to step S106. Subsequently, in step S106, the CPU (setting determination unit) 111 determines whether or not the setting of the camera 100 is a setting where the light emission of the flash can be performed. Specifically, the CPU 111 determines whether or not the light emission setting of the flash previously set in the camera 100 is set as "the light emission is not performed (no light emission)".

According to the present exemplary embodiment, the user can perform the setting as to whether or not the light emission by the built-in flash 116 or the external flash 200 can be performed on the basis of the setting screen for the setting as to whether or not the light emission by the built-in flash 116 or the external flash 200 can be performed which is illustrated in FIG. 3B.

FIG. 3B is the explanatory diagram for describing the setting screen for the setting as to whether or not this light emission can be performed for illustrative purpose. As illustrated in FIG. 3B, according to the present exemplary embodiment, a setting item "perform the light emission" where the built-in flash 116 or the external flash 200 can be caused to emit light and a setting item "do not perform the light emission" where the built-in flash 116 or the external flash 200 is not caused to emit light can be set as the setting items.

It is noted that a configuration may also be adopted in which a setting item where the light emission is forcibly performed and a setting item where the setting as to whether or not the light emission can be performed is automatically set in accordance with the result of the photometry calculation are prepared in addition to the setting item as illustrated in FIG. 3B. In addition, a configuration may also be adopted in which the setting as to whether or not the light emission by the built-in flash 116 or the external flash 200 can be performed is set by selecting a light emission mode such as "compulsory non-light emission mode" or "compulsory light emission mode".

The descriptions will be referred to FIG. 2 again. When it is determined that the setting as to whether or not the light emission by the flash can be performed is set as "do not perform the light emission" (step S106: YES), the CPU (display control unit) 111 displays the above-described setting screen related to the setting as to whether or not the light emission by the light emission unit can be performed on the display unit 115 in step S107. With this configuration, in a case where the setting set in the camera 100 as to whether or not the light emission by the flash can be performed is set as "do not perform the light emission", the user can easily check the setting again as to whether or not the light emission by the built-in flash 116 and the external flash 200 can be performed and perform the setting again.

When it is determined that the setting as to whether or not the light emission by the flash can be performed is set as "perform the light emission" (step S106: NO), the CPU (display control unit) 111 displays the setting screen for the built-in flash 116 (first setting screen) on the display unit 115 in step S108.

FIG. 3C is the explanatory diagram for describing the setting screen for the built-in flash 116 for illustrative purpose. As illustrated in FIG. 3C, according to the present exemplary embodiment, it is possible to set a light emission mode, a wireless setting, a light emission amount, a synchronization setting, and the like on the basis of the setting screen for the built-in flash 116. Descriptions of details of the respective setting items will be omitted. It is noted that the setting screen for the built-in flash 116 is not limited to the setting screen illustrated in FIG. 3C, and a configuration may also be adopted in which any item is displayed as long as the item is information related to the setting of the built-in flash 116.

When the user operates the operation unit 119 to select the respective items in a state in which the setting screen for the built-in flash 116 is displayed on the display unit 115, the detailed setting screen (change screen) in accordance with this selected item is displayed on the display unit 115. FIG. 3D is the explanatory diagram for describing this change screen for illustrative purpose and illustrating the change screen related to the light emission mode of the built-in flash 116 of FIG. 3C. It is noted that detailed descriptions of the light emission modes that can be set will be omitted.

With reference to FIG. 2 again, processing in a state in which the external flash 200 is connected to the camera 100 (step S101: YES) will be described. When it is detected that the external flash 200 is connected to the camera 100 (step S101: YES), the flow proceeds to the processing in step S109. In step S109, the CPU 111 determines whether or not the image pickup mode set in the camera 100 is the image pickup mode in which the setting related to the built-in flash 116 and the external flash 200 is not allowed. The processing in the subsequent steps S110 to S112 is similar to that in the above-described steps S105 to S107, and descriptions thereof will be omitted.

It is noted that the present exemplary embodiment relates to the configuration in which the built-in flash 116 does not move to the light emission position in a case where the external flash 200 is connected to the camera 100 even if the built-in flash 116 is located at the non-light emission position.

In step S113, the CPU 111 receives information related to the external flash 200 from the flash control unit 202. This information related to the external flash 200 also includes information that is not to be set in the built-in flash 116 in addition to the information related to the respective items as illustrated in FIG. 3C. This information includes, for example, information related to an illuminating angle of light or the like when the external flash 200 is caused to emit light. The received information related to the external flash 200 is recorded in the memory 109.

It is noted that the information related to the external flash 200 is information set in the external flash 200 when the processing in step S113 is performed, and is previously set by operating the operation unit for the external flash. In a case where an operation state of the external flash 200 is a sleep state, the CPU 111 obtains the information related to the external flash 200 after the operation state of the external flash 200 is changed into the activation state. It is noted that the sleep state refers to a state in which the power consumption is lower than in a case where the operation state of the external flash 200 is the activation state and also a state in which a predetermined operation in the external flash 200 is stopped. According to the present exemplary embodiment, a state in which the external flash 200 can be caused to emit light is set as the activation state, and a state in which the external flash 200 is not to be caused to emit light is set as the sleep state.

Next, in step S114, the CPU (display control unit) 111 reads out the previously received information related to the external flash 200 from the memory 109 and displays the setting screen for the external flash 200 (second setting screen) on the display unit 115 on the basis of this information.

FIG. 3E is the explanatory diagram for describing the setting screen for the external flash 200 for illustrative purposes. As illustrated in FIG. 3E, the setting screen for the external flash 200 according to the present exemplary embodiment is a screen to which the item for setting the above-described illuminating angle of light when the external flash 200 is caused to emit light or the like is added in addition to the setting screen for the built-in flash 116. That is, the setting screen for the external flash 200 is basically common to the setting screen for the built-in flash 116 and is the setting screen to which the setting item that can be set only in the external flash 200 is added.

It is noted that the present exemplary embodiment relates to the configuration in which the item that can be set only when the external flash 200 is used is not displayed as the setting item in the setting screen for the built-in flash 116 but is not limited to this. For example, a configuration may also be adopted in which the setting item that can be set only in a case where the external flash 200 is used is grayed out in the setting screen for the built-in flash 116. The flash setting processing according to the present exemplary embodiment has been described above.

As explained above, the camera 100 according to the present exemplary embodiment can display the setting screen related to the built-in flash 116 or the external flash 200 on the display unit 115 by using the pop-up switch 118. Specifically, the connection of the external flash 200 to the camera 100 is detected in accordance with the operation of the pop-up switch 118. Subsequently, it is possible to perform the setting as to whether the setting screen for the setting screen for the built-in flash 116 or the setting screen for the external flash 200 is displayed on the display unit 115 in accordance with this detection result.

With this configuration, when the user intends to change the setting related to the built-in flash 116 or the external flash 200, the user can display the setting screen for the flash on the display unit 115 without going through the setting screen for setting the other setting item. In addition, the user can simply display the setting screen intended by the user from the setting screens for the plurality of flashes classified into the plurality of hierarchical levels on the display unit 115. Therefore, the camera 100 according to the present exemplary embodiment can display the screen related to the setting of the light emission unit without the involvement of the complicated operation by the user.

In addition, according to the present exemplary embodiment, when the pop-up switch 118 is operated in a state in which the external flash 200 is not connected to the camera 100 and also a state in which the built-in flash 116 is popped up, the setting screen for the built-in flash 116 can be displayed on the display unit 115. Subsequently, when the pop-up switch 118 is operated in a state in which the built-in flash 116 is popped down, the built-in flash 116 can be popped up to the light emission position.

In this manner, according to the present exemplary embodiment, whether the setting screen for the built-in flash 116 is displayed or the built-in flash 116 is caused to pop up is switched depending on the position of the built-in flash 116 in accordance with the operation of the pop-up switch 118. With this configuration, this setting screen can be displayed on the display unit 115 without newly providing the operation unit for displaying the setting screen for the built-in flash 116 in the camera 100 according to the present exemplary embodiment.

According to the present exemplary embodiment, the camera 100 to which the external flash 200 can be connected has been described but is not limited to this. For example, the external flash 200 may not be connected to the camera 100. In this case, a configuration in which the above-described processings in steps S101 and S109 to S114 are not performed may be adopted.

Furthermore, according to the present exemplary embodiment, the configuration in which the external flash 200 is directly connected to the camera 100 has been described but is not limited to this. For example, a configuration may also be adopted in which wireless communication units are provided in the camera 100 and the external flash 200, and the camera 100 and the external flash 200 are connected to each other by using the wireless communication units.

Moreover, according to the present exemplary embodiment, the error display screen for notifying of the user that the flash setting is not available or the setting screen for setting the presence or absence of the light emission of the flash can be displayed on the display unit 115 in accordance with the image pickup mode set in the camera 100 or the setting as to whether or not the light emission by the flash can be performed. With this configuration, the user can check the current setting related to the built-in flash 116 or the external flash 200 and change this setting without the involvement of the complicated operation.

As explained above, the camera 100 according to the present exemplary embodiment can set the setting screen to be displayed on the display unit 115 in accordance with the various conditions such as the position of the built-in flash 116, the presence or absence of the connection of the external flash 200, the image pickup mode, and the setting as to whether or not the light emission by the flash can be performed. With these configurations, the camera 100 according to the present exemplary embodiment can improve the operability of the setting related to the built-in flash 116 and the external flash 200 with respect to the intention by the user.

The exemplary embodiments of the present invention have been described, but the present invention is not limited to these exemplary embodiments, and various modifications and alterations can be made within the gist of the present invention. The case where the built-in flash 116 according to the present exemplary embodiment adopts the configuration in which the built-in flash 116 can be popped up from the non-light emission position to the light emission position has been described but is not limited to this. For example, a configuration may also be adopted in which a built-in flash that can rotate at a position exposed from an outer package of the camera 100 is adopted. In this case, a position where the light emission unit of the built-in flash 116 is exposed from the camera 100 is set as the light emission position, and a position where this light emission unit is hidden is set as the non-light emission position.

It is noted that a configuration may also be adopted in which the display of this setting screen is terminated in accordance with the operation of the pop-up switch 118 in a state in which the setting screen for the built-in flash 116 or the external flash 200 is displayed on the display unit 115 in the camera 100 according to the present exemplary embodiment. In addition, a configuration may also be adopted in which the above-described display of the setting screen is terminated in accordance with a half-stroke operation of a release switch. That is, a configuration may also be adopted in which the display of this setting screen is terminated in accordance with the operation for displaying the other screen on the display unit 115 in a state in which the setting screen for the built-in flash 116 or the external flash 200 is displayed on the display unit 115.

Furthermore, according to the present exemplary embodiment, the configuration in which the setting screen for the built-in flash 116, the setting screen for the external flash 200, and the screen for setting the presence or absence of the light emission of the flash are different from each other have been described but is not limited to this. For example, all the above-described setting screens may be identical to each other.

It is noted that a configuration may also be adopted in which the built-in flash 116 moves to the light emission position in accordance with the operation of the pop-up switch 118 in a state in which the built-in flash 116 is located at the non-light emission position, and also the setting screen for the built-in flash 116 is displayed on the display unit 115.

Moreover, the above-described exemplary embodiment relates to the configuration in which the operation of the camera 100 is controlled while the control unit, the processing unit, and the like are provided in the camera 100 are operated in cooperation with each other, but the configuration is not limited to this. A configuration may also be adopted in which a program following the above-described flow of FIG. 2 is previously stored in the memory 109, and this program is executed by the CPU 111 to control the operation of the camera 100.

As long the function of the program is provided, any mode of the program such as an object code, a program executed by an interpreter, or script data supplied to an operating system (OS) may be employed. In addition, a magnetic recording medium such as a hard disc or a magnetic tape or an optical/opto-magnetic recording medium may be employed as a recording medium that supplies the program, for example.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-128587, filed Jun. 23, 2014, which is hereby incorporated by reference herein in its entirety.

What is claimed is:
1. An image pickup apparatus comprising:
a first light emission unit configured to be able to move to a light emission position and a non-light emission position;
a second light emission unit detachably attached to the image pickup apparatus;
an operation unit operable by a user; and
a display control unit configured to control a setting screen on a display unit,
wherein the operation unit is an operating member that is able to move the first light emission unit from the non-light emission position to the light emission position and able to display a first setting screen related to a setting of the first light emission unit and a second setting screen related to a setting of the second light emission unit on the display, in accordance with an operation of the operating unit by the user,
wherein, in a case where the second light emission unit is not attached to the image pickup apparatus, the first light emission unit is configured to move from the non-light emission position to the light emission position without displaying the first setting screen on the display unit in accordance with an operation of the operation unit in a state in which the first light emission unit is located at the non-light emission position, wherein, in a case where the second light emission unit is not attached to the image pickup apparatus, the display control unit is configured to display the first setting screen on the display unit in accordance with the operation of the operation unit without moving the first light emission unit in a state in which the first light emission unit is located at the light emission position, wherein, in a case where the second light emission unit is attached to the image pickup apparatus, the display control unit is configured to display the second setting screen on the display unit in accordance with the operation of the operation unit regardless of a position of the first light emission unit, wherein the first light emission unit is a built-in flash device of the image pickup apparatus, and wherein the second light emission unit is an external flash device detachably attached to the image pickup apparatus.

2. The image pickup apparatus according to claim 1, further comprising:

a movement control unit configured to perform a control for moving the first light emission unit based on operating the operation unit by the user, wherein, in a case where the second light emission unit is not attached to the image pickup apparatus, the movement control unit is configured to cause the first light emission unit to move from the non-light emission position to the light emission position without displaying the first setting screen on the display unit in accordance with the operation of the operation unit in a state in which the first light emission unit is located at the non-light emission position.

3. The image pickup apparatus according to claim 2, further comprising:

a first detection unit configured to detect a position of the first light emission unit, wherein, in a case where the second light emission unit is not attached to the image pickup apparatus, the movement control unit is configured to cause the first light emission unit to move from the non-light emission position to the light emission position without displaying the first setting screen on the display unit in a case where the first detection unit detects that the first light emission unit is located at the non-light emission position in accordance with the operation of the operation unit, and wherein, in a case where the second light emission unit is not attached to the image pickup apparatus, the display control unit is configured to display the first setting screen on the display unit without moving the first light emission unit in a case where the first detection unit detects that the first light emission unit is located at the light emission position in accordance with the operation of the operation unit.

4. The image pickup apparatus according to claim 3, further comprising:

a second detection unit configured to detect the second light emission unit that is connected to the image pickup apparatus, wherein the display control unit is configured to display the second setting screen on the display unit regardless of a detection result of the first detection unit in a case where the second detection unit detects that the second light emission unit is connected to the image pickup apparatus in accordance with the operation of the operation unit.

5. The image pickup apparatus according to claim 4, wherein the second setting screen includes a screen different from the first setting screen.

6. The image pickup apparatus according to claim 4, wherein the movement control unit is configured to cause the first light emission unit not to move from the non-light emission position to the light emission position in a case where the first detection unit detects that the first light emission unit is located at the non-light emission position and the second detection unit detects that the second light emission unit is connected to the image pickup apparatus in accordance with the operation of the operation unit.

7. The image pickup apparatus according to claim 1, wherein the display control unit is configured to display a screen indicating that the setting of the first light emission unit or the second light emission unit is not available on the display unit in accordance with the operation of the operation unit in a state in which a mode in which the setting of the first light emission unit and the second light emission unit is not available is set in the image pickup apparatus.

8. The image pickup apparatus according to claim 1, wherein the display control unit is configured to display a screen for performing a setting as to whether or not light emission by the first light emission unit and the second light emission unit can be performed on the display unit in accordance with the operation of the operation unit in a state in which the setting where light emission by the first light emission unit and the second light emission unit is not performed is set in the image pickup apparatus.

9. The image pickup apparatus according to claim 1, wherein the operation unit includes a pop-up switch that moves the first light emission unit from the non-light emission position to the light emission position.

10. The image pickup apparatus according to claim 1, wherein the light emission position is a position where light emission by the first light emission unit is allowed, and wherein the non-light emission position is a position other than the light emission position where the first light emission unit can move.

11. The image pickup apparatus according to claim 1, further comprising:

a second operation unit which is different form the operation unit and operable by a user;

wherein, in a case where the second light emission unit is not attached to the image pickup apparatus, the display control unit is configured to display the first setting screen after going through a plurality of setting screens which is displayed on the display unit in accordance with an operation of the second operation unit when a predetermined setting screen is displayed on the display unit, and wherein, in a case where the second light emission unit is not attached to the image pickup apparatus, the display control unit is configured to display the first setting screen on the display unit without going through the plurality of setting screens in accordance with the operation of the operation unit in a state in which the first light emission unit is located at the light emission position when the predetermined setting screen is displayed on the display unit.

12. The image pickup apparatus according to claim 1,
wherein the light emission position is a position where the first light emission unit is exposed from the image pickup apparatus, and
wherein the non-light emission position is a position where the first light emission unit is housed in the image pickup apparatus.

13. A control method for an image pickup apparatus including a first light emission unit configured to be able to move to a light emission position and a non-light emission position, a second light emission unit configured to detachably attached to the image pickup apparatus and an operation unit operable by the user, the control method comprising:

controlling a setting screen on a display unit,
wherein the operation unit is operating member that is able to move the first light emission unit from non-light emission position to the light emission position and able to display a first setting screen related to a setting of the first light emission unit and a second setting screen related to a setting of the second light emission unit on the display, in accordance with an operation of the operating unit by the user,
in a case where the second light emission unit is not attached to the image pickup apparatus, moving the first light emission unit from the non-light emission position to the light emission position without displaying the first setting screen on the display unit in accordance with the operation of the operation unit in a state in which the light emission unit is located at the non-light emission position,
in a case where the second light emission unit is not attached to the image pickup apparatus, displaying the first setting screen on the display unit without moving the first light emission unit in accordance with the operation of the operation unit in a state in which the first light emission unit is located at the first light emission position,
in a case where the second light emission unit is attached to the image pickup apparatus, displaying the second setting screen on the display unit in accordance with the operation of the operation unit regardless of a position of the first light emission unit,
wherein the first light emission unit is a built-in flash device of the image pickup apparatus, and
wherein the second light emission unit is an external flash device detachably attached to the image pickup apparatus.

* * * * *